United States Patent
Abe et al.

(10) Patent No.: US 8,643,958 B2
(45) Date of Patent: Feb. 4, 2014

(54) WIDE ANGLE LENS AND IMAGING DEVICE

(75) Inventors: Issei Abe, Kanagawa (JP); Hayato Yoshida, Iwate (JP); Naoki Moniwa, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 317 days.

(21) Appl. No.: 13/257,446

(22) PCT Filed: Mar. 24, 2010

(86) PCT No.: PCT/JP2010/055782
§ 371 (c)(1),
(2), (4) Date: Sep. 19, 2011

(87) PCT Pub. No.: WO2010/122882
PCT Pub. Date: Oct. 28, 2010

(65) Prior Publication Data
US 2012/0056978 A1    Mar. 8, 2012

(30) Foreign Application Priority Data

Apr. 24, 2009  (JP) ................................ 2009-106706

(51) Int. Cl.
*G02B 9/64* (2006.01)
*G02B 13/18* (2006.01)

(52) U.S. Cl.
USPC ............................ 359/755; 359/708; 359/793

(58) Field of Classification Search
CPC ............ G02B 3/02; G02B 9/64; G02B 13/02; G02B 13/04; G02B 13/18
USPC .......... 359/708, 745, 749–751, 755, 793–795
See application file for complete search history.

(56) References Cited

U.S. PATENT DOCUMENTS

| 3,645,605 | A  | * | 2/1972 | Nakagawa ................... 359/751 |
| 6,853,495 | B2 | * | 2/2005 | Kondo et al. ................ 359/680 |
| 7,944,626 | B2 | * | 5/2011 | Lin ............................... 359/755 |
| 2006/0274433 | A1 | | 12/2006 | Kamo |
| 2007/0139793 | A1 | | 6/2007 | Kawada |
| 2009/0122422 | A1 | | 5/2009 | Yoshida et al. |

(Continued)

FOREIGN PATENT DOCUMENTS

| JP | 4 246606 | 9/1992 |
| JP | 2005 345577 | 12/2005 |

(Continued)

OTHER PUBLICATIONS

U.S. Appl. No. 13/256,271, filed Sep. 13, 2011, Yoshida, et al.

(Continued)

*Primary Examiner* — Darryl J Collins
(74) *Attorney, Agent, or Firm* — Oblon, Spivak, McClelland, Maier & Neustadt, L.L.P.

(57) ABSTRACT

A wide angle lens whose field angle exceeds 160 degrees, includes a front group, an aperture stop, and a rear group arranged in this order from an object-side toward an image-side. The front group includes a first lens (negative meniscus) whose convex surface faces the object, a second lens (negative), a third lens (negative), and a fourth lens (positive), arranged in this order from the object-side toward the image-side. The rear group includes a fifth lens (positive), a sixth lens (negative), and a seventh lens (positive), arranged in this order from an aperture-side toward the image-side. The fifth and sixth lenses are combined, forming a cemented lens having positive refractive power. The fifth and sixth lenses are made of materials having Abbe numbers of greater than or equal to 50 and less than or equal to 30, respectively. A surface of the seventh lens facing the image is aspheric.

9 Claims, 21 Drawing Sheets

(56) References Cited

U.S. PATENT DOCUMENTS

| | | |
|---|---|---|
| 2010/0254025 A1 | 10/2010 | Yoshida et al. |
| 2011/0169912 A1 | 7/2011 | Abe et al. |

FOREIGN PATENT DOCUMENTS

| | | |
|---|---|---|
| JP | 2006 337691 | 12/2006 |
| JP | 2007 164079 | 6/2007 |
| JP | 2008 134494 | 6/2008 |
| JP | 2008 276185 | 11/2008 |
| JP | 2010 243709 | 10/2010 |

OTHER PUBLICATIONS

International Search Report issued May 18, 2010 in PCT/JP10/055782 filed Mar. 24, 2010

* cited by examiner

FIG.3

| | CURVATURE RADIUS | INTER-SURFACE INTERVAL | REFRACTIVE INDEX | ABBE NUMBER | ASPHERIC SURFACE |
|---|---|---|---|---|---|
| 1 | 12.808 | 0.930 | 1.7995 | 42.2 | |
| 2 | 5.091 | 1.530 | | | |
| 3 | 8.316 | 0.910 | 1.8348 | 42.7 | |
| 4 | 3.054 | 1.650 | | | |
| 5 | | 1.090 | 1.6779 | 55.3 | |
| 6 | 2.711 | 0.800 | | | |
| 7 | 7.373 | 6.000 | 1.7283 | 28.5 | |
| 8 | -4.280 | 0.600 | | | |
| 9 (APERTURE STOP) | | 0.110 | | | |
| 10 | 2.904 | 1.400 | 1.6779 | 55.3 | |
| 11 | -2.904 | 0.900 | 1.9229 | 20.9 | |
| 12 | 5.091 | 0.280 | | | |
| 13 | 15.309 | 1.000 | 1.5305 | 55.8 | ○ |
| 14 | -2.895 | 1.900 | | | ○ |
| 15 (CG) | | 0.500 | 1.5230 | 58.6 | |
| 16 (CG) | | 0.254 | | | |
| 17 (IMAGING SURFACE) | | | | | |

FIG.4

|    | K         | A        | B         | C        | D         | E        | F         |
|----|-----------|----------|-----------|----------|-----------|----------|-----------|
| 13 | -2.57E+01 | 9.41E-03 | -2.06E-02 | 5.67E-02 | -4.96E-02 | 2.18E-02 | -3.77E-03 |
| 14 | -2.66E+00 | 1.80E-02 | -2.08E-02 | 3.33E-02 | -1.57E-02 | 3.43E-03 | 1.28E-05  |

FIG.5

| | CURVATURE RADIUS | INTER-SURFACE INTERVAL | REFRACTIVE INDEX | ABBE NUMBER | ASPHERIC SURFACE |
|---|---|---|---|---|---|
| 1 | 10.700 | 0.600 | 1.7725 | 49.6 | |
| 2 | 3.975 | 2.140 | | | |
| 3 | 7.660 | 0.600 | 1.7725 | 49.6 | |
| 4 | 2.500 | 1.610 | | | |
| 5 | 13.103 | 0.620 | 1.6180 | 63.3 | |
| 6 | 3.500 | 0.790 | | | |
| 7 | -79.102 | 5.570 | 1.7618 | 26.5 | |
| 8 | -4.588 | 0.980 | | | |
| 9 (APERTURE STOP) | | 0.570 | | | |
| 10 | 3.615 | 2.180 | 1.6400 | 60.1 | |
| 11 | -2.500 | 0.910 | 1.8467 | 23.8 | |
| 12 | 5.665 | 0.300 | | | |
| 13 | 4.340 | 1.800 | 1.5305 | 55.8 | ○ |
| 14 | -2.201 | 1.700 | | | ○ |
| 15 (CG) | | 0.500 | 1.5460 | 55.0 | |
| 16 (CG) | | 0.100 | | | |
| 17 (IMAGING SURFACE) | | | | | |

FIG.6

| | K | A | B | C | D | E | F | G | H |
|---|---|---|---|---|---|---|---|---|---|
| 13 | -8.89E-01 | -8.46E-03 | 2.76E-03 | -4.79E-04 | 6.20E-04 | -5.68E-05 | -3.28E-05 | 5.80E-06 | |
| 14 | -3.24E+00 | -1.28E-02 | 3.73E-03 | 2.56E-04 | -1.22E-04 | 6.89E-05 | -1.28E-05 | 6.82E-06 | -4.02E-07 |

WIDE ANGLE LENS AND IMAGING DEVICE

TECHNICAL FIELD

The present invention relates to a wide angle lens and an imaging device.

BACKGROUND ART

Monitor cameras and in-vehicle cameras, including a combination of imaging lenses and area sensors, are being put into practical use.

The imaging lens, which is used in monitor cameras or in-vehicle cameras, preferably has a wide imaging range. Therefore, the imaging lens needs to have a wide field angle.

The imaging lens is also preferably high-resolution.

For example, when the imaging lens is used in an in-vehicle camera, the imaging lens is required to have sufficiently high resolution for the following purpose. That is, the imaging lens is used for observing road conditions at close range (to observe whether there are any small dangerous articles such as nails and glass fragments), and for observing distant road conditions on a highway where the vehicle is travelling at high speed.

In another example, when the imaging lens is used in a monitor camera for security, the imaging lens is required to have sufficiently high resolution for the following purposes. Specifically, the imaging lens is used for clearly imaging/observing a person and belongings of the person (dangerous articles such as a knife).

Furthermore, monitor cameras and in-vehicle cameras are often used outdoors. Thus, the brightness of the environment changes significantly between daytime and nighttime. In order to successfully perform imaging at nighttime, the imaging lens needs to have high brightness.

Furthermore, there is demand for compact monitor cameras and compact in-vehicle cameras. Therefore, it is important that the size of the lens is compact.

Conventionally, there is an imaging lens including seven lenses that may be used in monitor cameras or in-vehicle cameras (see patent documents 1 and 2). This imaging lens has a wide angle, relatively good performance, high brightness, and a relatively compact size.

The imaging lenses disclosed in patent documents 1 and 2 both have a wide angle exceeding 180 degrees. Furthermore, they both include a small number of lenses (seven lenses) and are thus advantageously compact in size.

However, in order to increase the resolution of an imaging lens having a sufficiently wide angle for in-vehicle cameras and monitor cameras, the chromatic aberration needs to be corrected properly.

In the imaging lens described in patent document 1, the chromatic aberration between the red light and the blue light is approximately 0.05 mm (50 µm). Thus, when an imaging element having a pixel pitch of approximately 6 µm is used, the imaging positions of the red light and the blue light are displaced by eight pixels or more in the same image. Consequently, the formed color image will have low resolution.

As to the imaging lens disclosed in patent document 2, the extent to which the chromatic aberration is corrected is unknown, and therefore the resolution is unknown.

Patent Document 1: Japanese Laid-Open Patent Application No. 2006-337691

Patent Document 2: Japanese Laid-Open Patent Application No. 2005-345577

Patent Document 3: Japanese Laid-Open Patent Application No. 2008-276185

DISCLOSURE OF INVENTION

Aspects of the present invention provide a wide angle lens and an imaging device that solve or reduce one or more problems caused by the limitations and disadvantages of the related art.

An aspect of the present invention provides a wide angle lens whose field angle exceeds 160 degrees, including a front group, an aperture stop, and a rear group, which are arranged in the stated order from an object side toward an image side, wherein the front group includes a first lens that is a negative meniscus lens whose convex surface is facing the object side, a second lens that is a negative lens, a third lens that is a negative lens, and a fourth lens that is a positive lens, which are arranged in the stated order from the object side toward the image side, the rear group includes a fifth lens that is a positive lens, a sixth lens that is a negative lens, and a seventh lens that is a positive lens, which are arranged in the stated order from an aperture stop side toward the image side, wherein the fifth lens and the sixth lens are combined together forming a cemented lens having positive refractive power, the first to seventh lenses form an imaging system including a total of seven lenses, the fifth lens is made of a material having an Abbe number $\nu d5$ that is greater than or equal to 50, the sixth lens is made of a material having an Abbe number $\nu d6$ that is less than or equal to 30, and a surface of the seventh lens facing the image side is an aspheric surface.

BRIEF DESCRIPTION OF DRAWINGS

FIG. 3 indicates data of specifications of a wide angle lens according to practical example 1;

FIG. 4 indicates aspheric surface data of the wide angle lens according to practical example 1;

FIG. 5 indicates data of specifications of a wide angle lens according to practical example 2;

FIG. 6 indicates aspheric surface data of the wide angle lens according to practical example 2;

BEST MODE FOR CARRYING OUT THE INVENTION

Embodiments of the present invention are described below with reference to the accompanying drawings.

Figure 1:
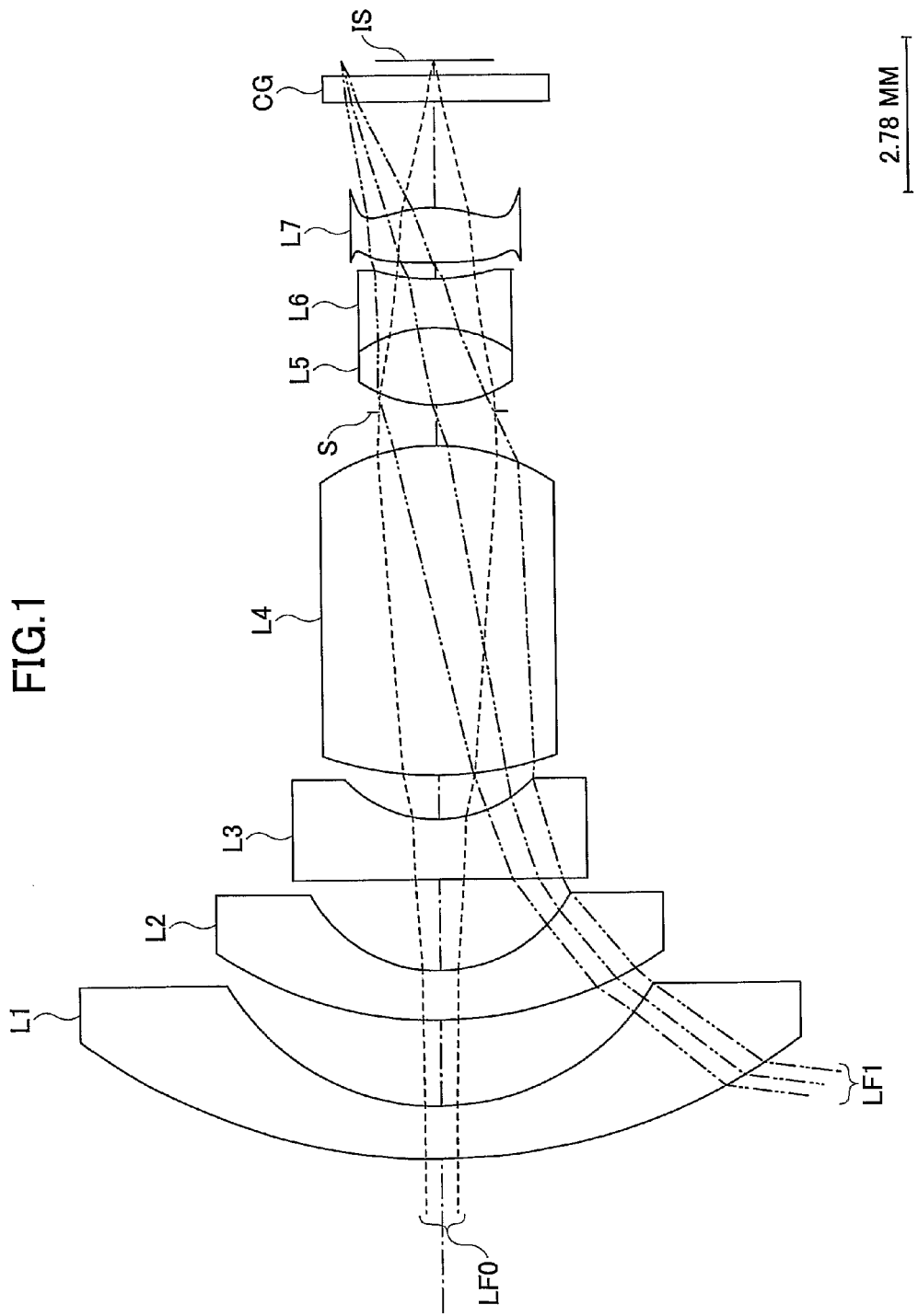
FIG. 1 illustrates a wide angle lens according to an embodiment of the present invention and an on-axis light beam and an off-axis light beam.

FIG. 1 illustrates a wide angle lens according to an embodiment of the present invention. This wide angle lens corresponds to practical example 1 described below.

The wide angle lens includes a first lens L1 to a seventh lens L7, which are arranged from the left side (the side closer to an object, i.e., the object side) toward the right side (the side closer to the image, i.e., the image side) as viewed in FIG. 1.

The first lens L1 is a negative meniscus lens whose convex surface is facing the object (object-side surface). The second lens L2 and the third lens L3 are also negative meniscus lenses whose convex surfaces are facing the object. The fourth lens L4 is a double-convex lens. The first lens L1, the second lens L2, the third lens L3, and the fourth lens L4 form a front group. The power distribution in the front group is "negative/negative/negative/positive".

An aperture stop S is disposed at a position on the image side of the fourth lens L4. On the image side of the aperture stop S, three lenses are arranged, forming a rear group. Specifically, a fifth lens L5, a sixth lens L6, and a seventh lens L7 are arranged in the stated order from the aperture stop S toward the image side.

The fifth lens L5 is a double-convex lens and the sixth lens L6 is a double-concave lens. The fifth lens L5 and the sixth lens L6 are combined together (cemented). The cemented lens, which is formed by combining the fifth lens L5 and the sixth lens L6, has positive refractive power. The seventh lens L7 has aspheric surfaces on both sides, and is shaped as a double-convex lens in the paraxial region.

The aperture stop S is disposed at a position between the front group and the rear group, i.e., at a position close to the object-side surface of the fifth lens L5.

In FIG. 1, CG denotes a cover glass of an imaging element (CCD area sensor) and IS denotes the imaging plane. The imaging plane IS corresponds to the receiving surface of a color imaging element. The color imaging element may be a known element, having pixels that are arranged two-dimensionally. The color imaging element converts an image of a target, which has been formed by the wide angle lens, into electronic image data.

LF0 denotes an on-axis light beam (light beam along the axis) and LF1 denotes the most off-axis light beam. The angle at which the most off-axis light beam LF1 is entering the first lens L1 shows that this wide angle lens has a field angle exceeding 160 degrees.

The first lens L1 to the sixth lens L6 are glass lenses, and the seventh lens L7 is a resin lens.

Figure 2:
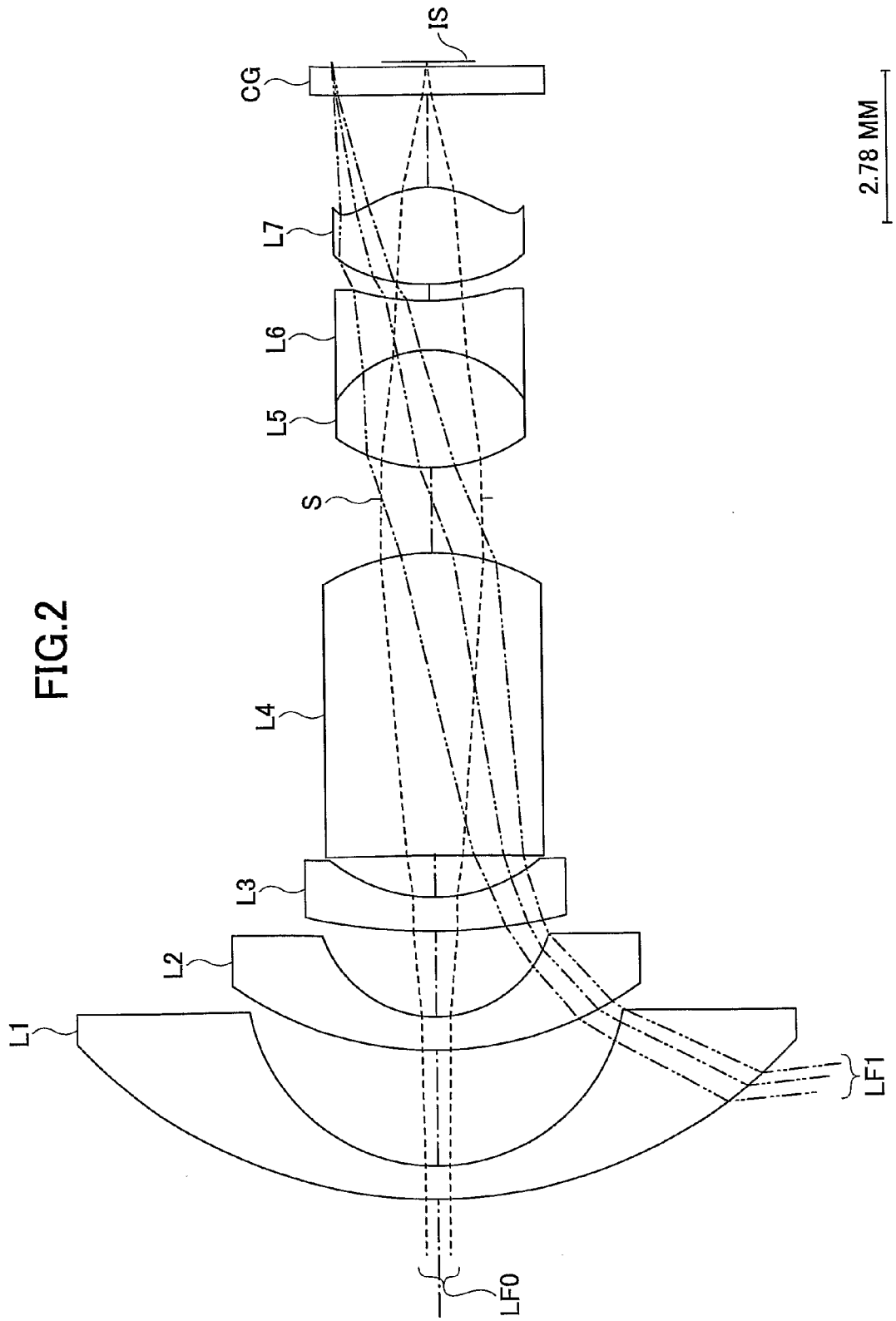
FIG. 2 illustrates a wide angle lens according to another embodiment of the present invention and an on-axis light beam and an off-axis light beam.

FIG. 2 illustrates a wide angle lens according to another embodiment of the present invention. This wide angle lens corresponds to practical example 2 described below. In FIG. 2, elements that substantially correspond to those of FIG. 1 are denoted by the same reference numerals.

The wide angle lens includes a first lens L1 to a seventh lens L7, which are arranged from the left size (the side closer to an object, i.e., the object side) toward the right side (the side closer to the image, i.e., the image side) as viewed in FIG. 2.

The first lens L1 is a negative meniscus lens whose convex surface is facing the object (object-side surface). The second lens L2 and the third lens L3 are also negative meniscus lenses whose convex surfaces are facing the object. The fourth lens L4 is a positive meniscus lens, in which the surface having a large curvature is facing the image (image-side surface). The first lens L1, the second lens L2, the third lens L3, and the fourth lens L4 form a front group. The power distribution in the front group is "negative/negative/negative/positive".

An aperture stop S is disposed at a position on the image side of the fourth lens L4. On the image side of the aperture stop S, three lenses are arranged, forming a rear group. Specifically, a fifth lens L5, a sixth lens L6, and a seventh lens L7 are arranged in the stated order from the aperture stop S toward the image side.

The fifth lens L5 is a double-convex lens and the sixth lens L6 is a double-concave lens. The fifth lens L5 and the sixth lens L6 are combined together (cemented). The cemented lens, which is formed by combining the fifth lens L5 and the sixth lens L6, has positive refractive power. The seventh lens L7 has aspheric surfaces on both sides, and is shaped as a double-convex lens in the paraxial region.

The aperture stop S is disposed at a position between the front group and the rear group, i.e., at a position somewhat close to the object-side surface of the fifth lens L5.

Similar to FIG. 1, CG denotes a cover glass of an imaging element (CCD area sensor) and IS denotes the imaging plane. The imaging plane IS corresponds to the receiving surface of a color imaging element.

LF0 denotes an on-axis light beam (light beam along the axis) and LF1 denotes the most off-axis light beam. The angle at which the most off-axis light beam LF1 is entering the first lens L1 shows that this wide angle lens has a field angle exceeding 190 degrees.

The first lens L1 to the sixth lens L6 are glass lenses, and the seventh lens L7 is a resin lens.

PRACTICAL EXAMPLE 1

A description is given of a practical example of the wide angle lens shown in FIG. 1. Any of the lengths mentioned below are in units of mm.

The lens of practical example 1 has a field angle of 165 degrees (half field angle of 82.5 degrees), a focal length of 1.166 mm, and an F-number of 2.0.

FIG. 3 indicates data of specifications of practical example 1.

The leftmost column in the table of FIG. 3 indicates surface numbers, starting from the surface of the first lens L1 facing the object to the imaging surface IS. Surfaces having surface numbers include the surfaces of the lenses, the surface of the aperture stop S, both surfaces of the cover glass CG, and the imaging surface.

In relation with FIG. 1, surface numbers 1 through 8 correspond to the object-side/image-side surfaces of the first lens L1 through the fourth lens L4. Surface number 9 corresponds to the surface of the aperture stop S. Surface numbers 10 through 14 correspond to the object-side/image-side surfaces of the fifth lens L5 through the seventh lens L7. Surface number 15 and 16 correspond to the object-side/image-side surfaces of the cover glass CG. Surface number 17 corresponds to the surface of the imaging surface IS. Surface number 11 corresponds to the surface where the fifth lens L5 and the sixth lens L6 are cemented.

The circles in the aspheric surface column indicate that the corresponding lens surface is aspheric. As shown in FIG. 3, both surfaces of the seventh lens L7 (surface numbers 13 and 14) are aspheric. The values in the curvature radius column for aspheric surfaces correspond to the paraxial curvature radius.

The shape of an aspheric surface is expressed by a known formula indicated below, where a coordinate in a direction orthogonal to the optical axis is h, the coordinate in the optical axial direction is Z, the paraxial curvature radius is R, the conical constant is K, and the high order aspheric surface coefficients are A, B, C, D, E, and F. The shape is specified by applying values of K and A through F.

$$Z=(h^2/R)/[1+\{1-(1+K)(h^2/R^2)\}^{1/2}]+Ah^2+Bh^4+Ch^6+Dh^8+Eh^{10}+Fh^{12}$$

FIG. 4 indicates aspheric surface data of practical example 1. The leftmost column in the table of FIG. 4 indicates surface numbers.

In FIG. 4, 9.41E-03 means $9.41 \times 10^{-3}$, for example. The same applies to practical example 2 described below.

PRACTICAL EXAMPLE 2

A description is given of practical example 2 of the wide angle lens shown in FIG. 2.

The lens of practical example 2 has a field angle of 190 degrees (half field angle of 95 degrees), a focal length of 0.946 mm, and an F-number of 2.0.

FIG. 5 indicates data of specifications of practical example 2, in a manner similar to FIG. 3.

In relation with FIG. 2, surface numbers 1 through 8 correspond to the object-side/image-side surfaces of the first lens L1 through the fourth lens L4. Surface number 9 corresponds to the surface of the aperture stop S. Surface numbers 10 through 14 correspond to the object-side/image-side surfaces of the fifth lens L5 through the seventh lens L7. Surface number 15 and 16 correspond to the object-side/image-side surfaces of the cover glass CG. Surface number 17 corresponds to the surface of the imaging surface IS. Surface number 11 corresponds to the surface where the fifth lens L5 and the sixth lens L6 are cemented.

Both surfaces of the seventh lens L7 (surface numbers 13 and 14) are aspheric, as indicated by circles in the table.

FIG. 6 indicates aspheric surface data of practical example 2, in a manner similar to FIG. 4.

As described above, each of the wide angle lenses of practical examples 1 and 2 includes a front group, the diaphragm S, and a rear group, arranged in the stated order from the object side toward the image side. The front group includes the first lens L1 that is a negative meniscus lens whose convex surface is facing the object, the second lens L2 and the third lens L3 that are negative lenses, and the fourth lens L4 that is a positive lens, arranged in the stated order from the object side toward the image side. The rear group includes the fifth lens L5 that is a positive lens, the sixth lens L6 that is a negative lens, and the seventh lens L7 that is a positive lens, arranged in the stated order from the aperture stop S (aperture stop side) toward the image side. The fifth lens L5 and the sixth lens L6 are combined together.

The material of the fourth lens L4 in the front group has an Abbe number vd4 of 28.5 in practical example 1 and 26.5 in practical example 2. The material of the sixth lens L6 has an Abbe number vd6 of 20.9 in practical example 1 and 23.8 in practical example 2. Accordingly, in both examples, the Abbe number is less than 30.

Furthermore, the material of the fifth lens L5 has an Abbe number vd5 of 55.3 in practical example 1 and 60.1 in practical example 2. Accordingly, in both examples, the Abbe number exceeds 50.

The F-number is 2.0 in both practical example 1 and practical example 2, as described above.

The ratio (parameter d4/F) of the thickness d4 of the fourth lens L4 and the focal length F of the entire imaging system is 5.15(=6.00/1.166) in practical example 1 and 5.89(=5.57/0.946) in practical example 2. Therefore, the following condition (1) is satisfied in either case.

$$5.0 < d4/F < 6.0 \quad (1)$$

If the parameter d4/F was less than or equal to 5.0, the following problem would arise. Specifically, it would be difficult to maintain a low spherical surface aberration and a low coma aberration, while maintaining a proper balance between the chromatic aberration of magnification of the first to third lenses and the chromatic aberration of magnification at the surface of the fourth lens (used for correction) facing the aperture stop S. Thus, the resolution may decrease.

If the parameter d4/F was greater than or equal to 6.0, the following problem would arise. Specifically, the fourth lens L4 would be too thick, thus increasing the total length of the wide angle lens. Consequently, the size of the wide angle lens may not be compact.

The seventh lens L7 is an aspheric lens (both sides are aspheric) made of resin. The first to sixth lenses L1 to L6 are made of glass.

The back focus (the length along the optical axis from the image-side surface of the sixth lens L6 to the imaging surface) is 2.654 mm in practical example 1 and 2.3 mm in practical example 2. The total optical length, which is the length along the optical axis from the object-side surface of the first lens L1 to the imaging surface, is 19.854 mm in practical example 1 and 20.97 mm in practical example 2.

The effective diameter of the first lens L1, which defines the size of the wide angle lens in the direction orthogonal to the optical axis, is 12.8 mm in practical example 1 and 13.2 mm in practical example 2. As described above, the wide angle lenses according to practical examples 1 and 2 have a compact size.

Figure 7:
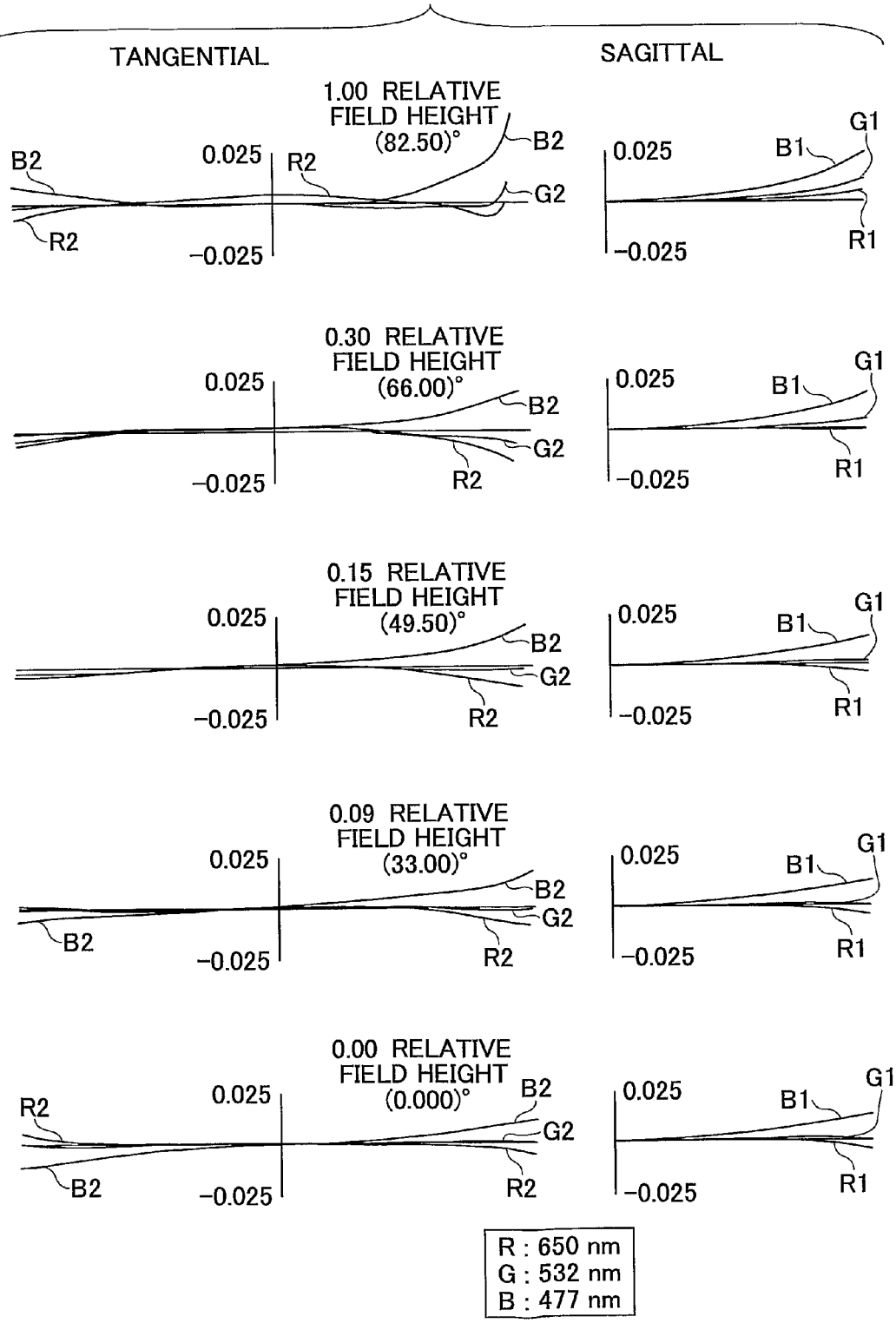
FIG. 7 illustrates horizontal aberrations of the wide angle lens according to practical example 1 in a tangential direction and a sagittal direction.
Figure 8:
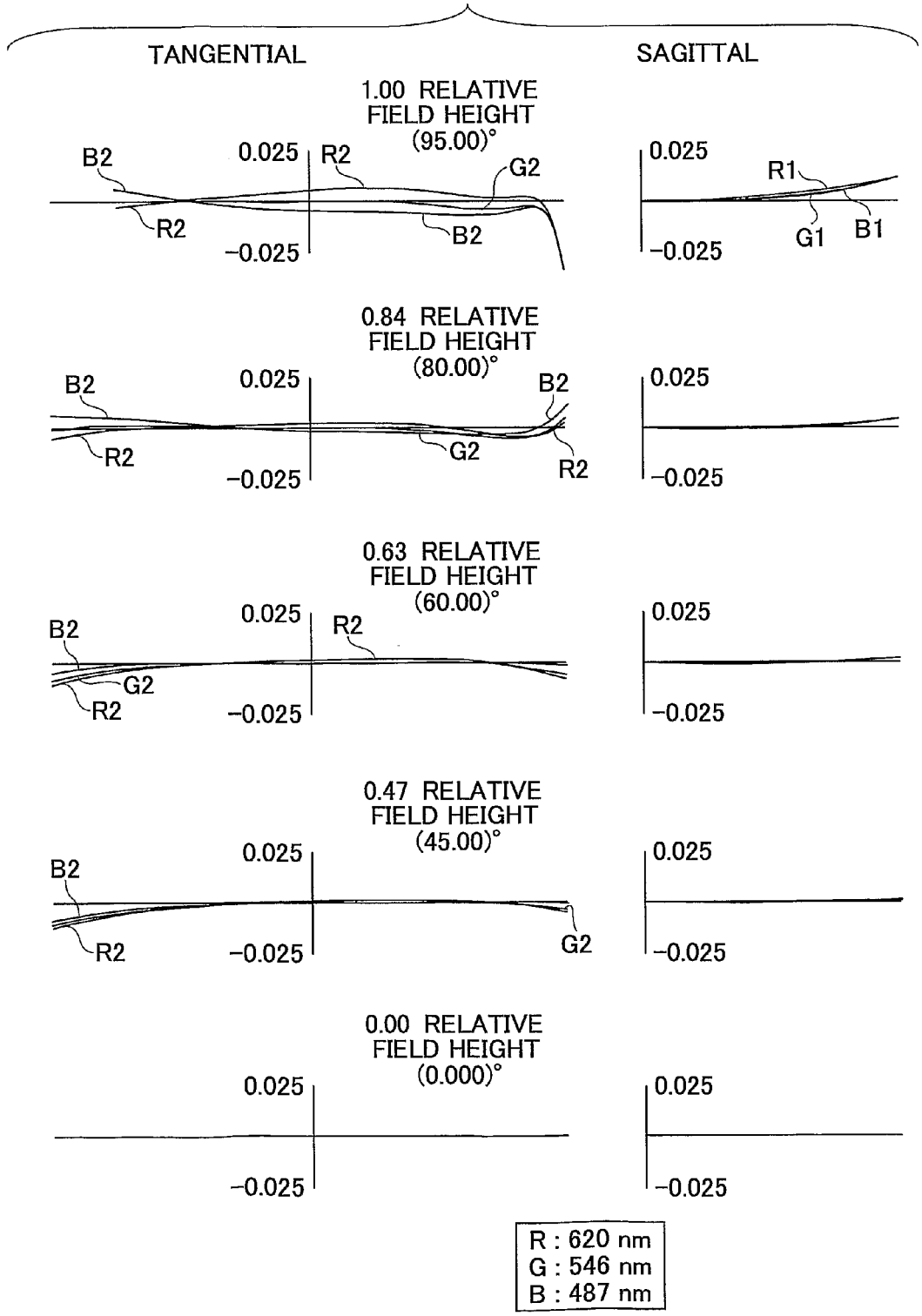
FIG. 8 illustrates horizontal aberrations of the wide angle lens according to practical example 2 in a tangential direction and a sagittal direction.

FIG. 7 illustrates horizontal aberrations of practical example 1, including coma aberrations in a tangential direction and a sagittal direction. FIG. 8 illustrates horizontal aberrations of practical example 2, including coma aberrations in a tangential direction and a sagittal direction.

Figure 9:
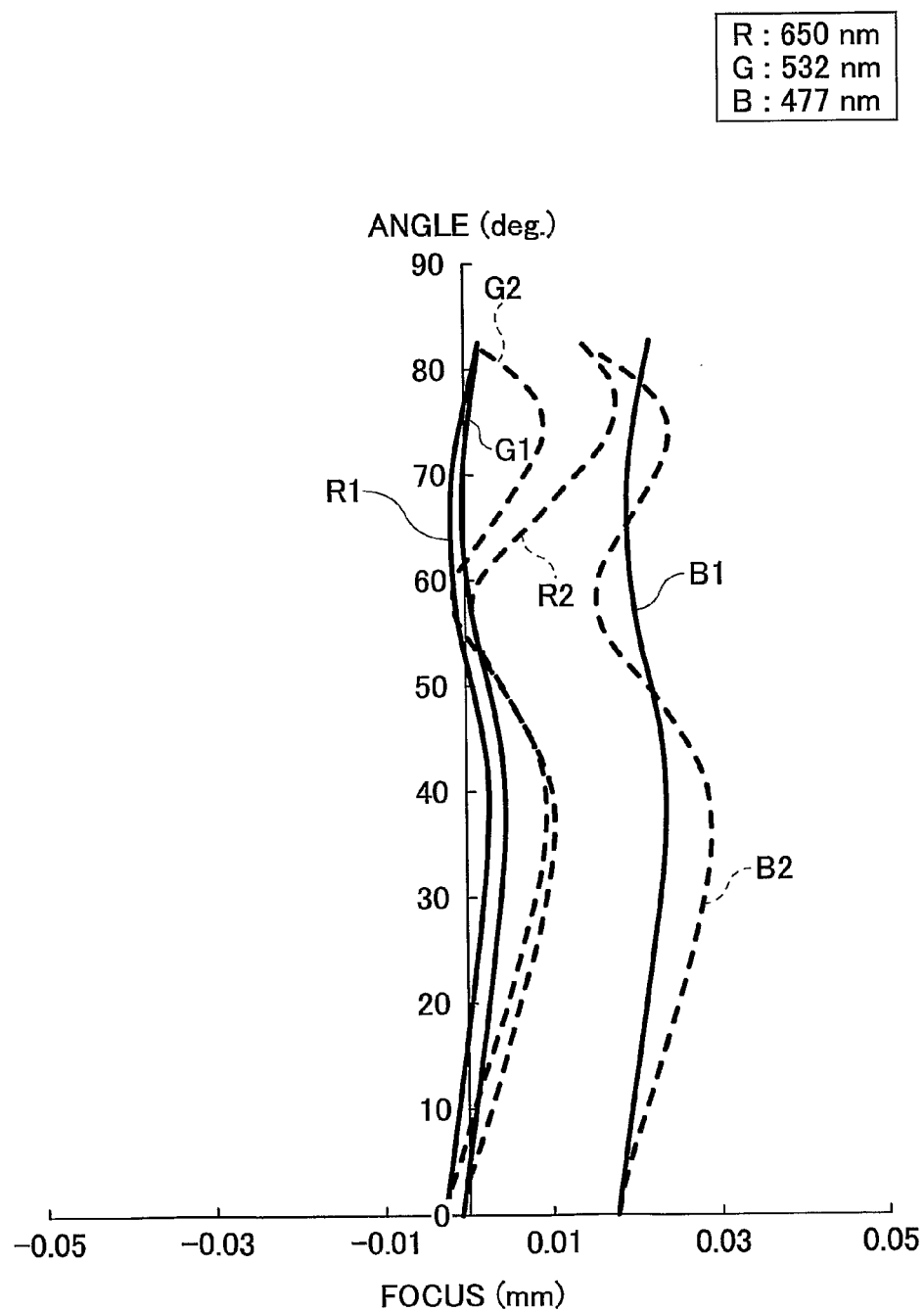
FIG. 9 is an astigmatism diagram of the wide angle lens according to practical example 1.
Figure 10:
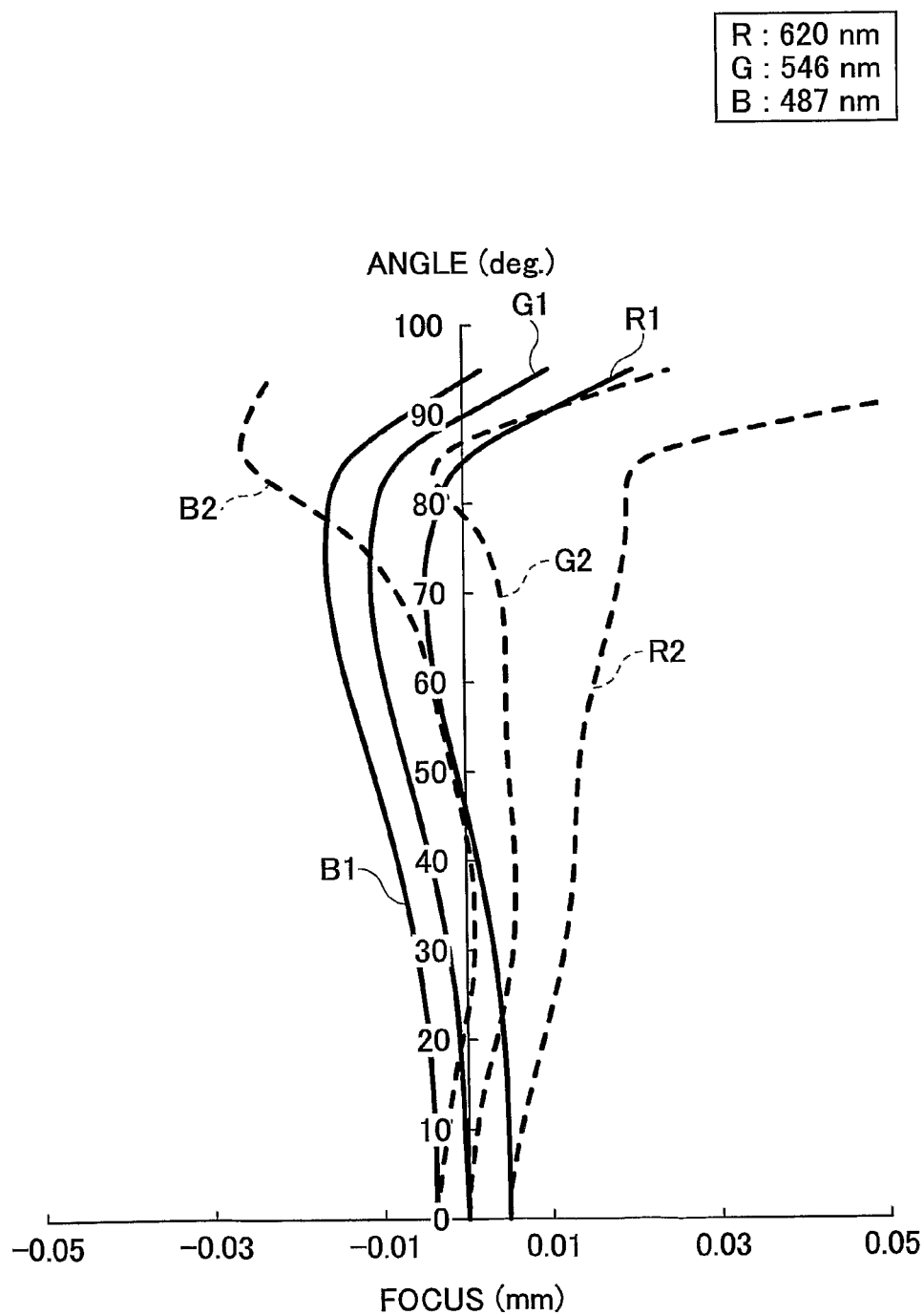
FIG. 10 is an astigmatism diagram of the wide angle lens according to practical example 2.

FIG. 9 is an astigmatism diagram of practical example 1. FIG. 10 is an astigmatism diagram of practical example 2. In FIGS. 7 through 10, R1 and R2 correspond to light beams having a wavelength of 650 nm, G1 and G2 correspond to light beams having a wavelength of 532 nm, and B1 and B2 correspond to light beams having a wavelength of 477 nm. R1, G1, and B1 indicate the sagittal direction, and R2, G2, and B2 indicate the tangential direction.

As shown in FIGS. 9 and 10, the astigmatism is successfully corrected in both practical examples 1 and 2. The astigmatism is particularly successfully corrected in practical example 1. When the astigmatism is successfully corrected, the resolution can be increased.

Figure 11:
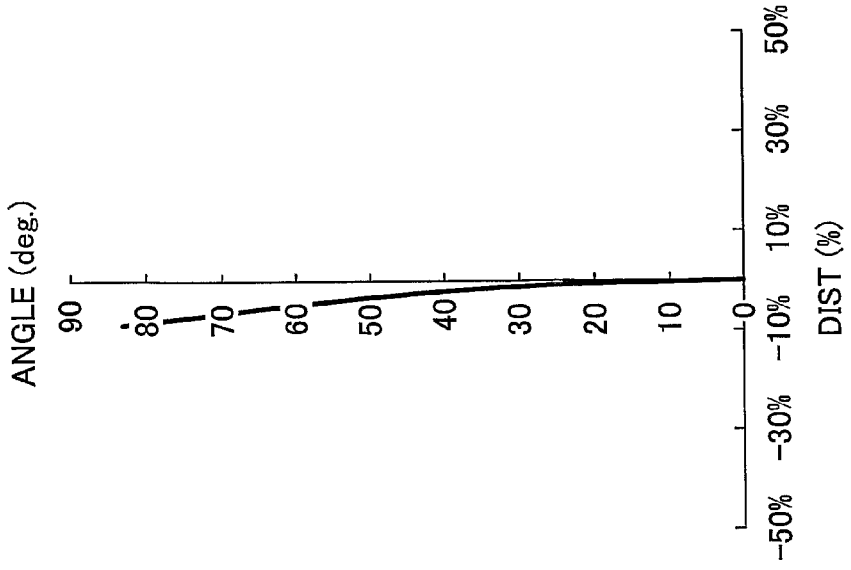
FIG. 11 illustrates distortion aberrations of the wide angle lens according to practical example 1.
Figure 12:
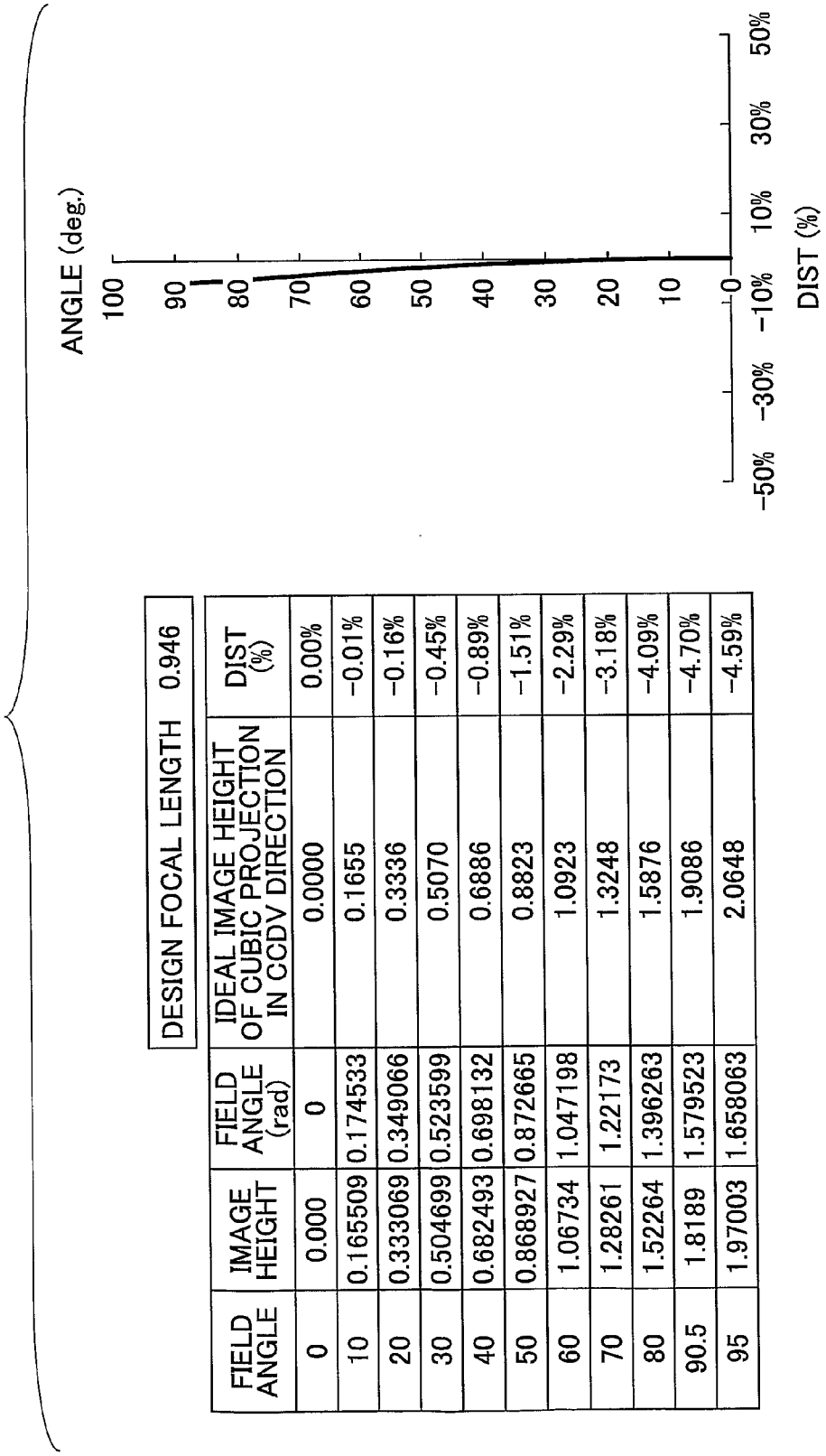
FIG. 12 illustrates distortion aberrations of the wide angle lens according to practical example 2.

FIGS. 11 and 12 illustrate distortion aberrations with respect to various field angles. FIG. 11 is relevant to practical example 1 and FIG. 12 is relevant to practical example 2. The table on the left in FIGS. 11 and 12 indicates calculated values, and the diagram on the right in FIGS. 11 and 12 is a distortion aberration diagram. In the distortion aberration diagram, the vertical axis indicates the half field angle (the incidence angle of an incident light beam with respect to an optical axis), and the horizontal axis indicates the distortion amount (%). The distortion aberration is indicated in a perpendicular direction in the imaging element by a cubic projection method. Specifically, the distortion aberration is expressed by the following formula $$Y=2f\tan(\theta/2)$$

where the focal length is f, the image height is Y, and the half field angle is θ.

The distortion aberration diagram on the right side in FIGS. 11 and 12 may be corrected by performing an electronic process on the electronic data output by a color imaging element, according to need or request. In both practical examples 1 and 2, the distortion aberration is purposely generated as shown in FIGS. 11 and 12, so that the displayed image can be easily observed by the user.

Figure 13:
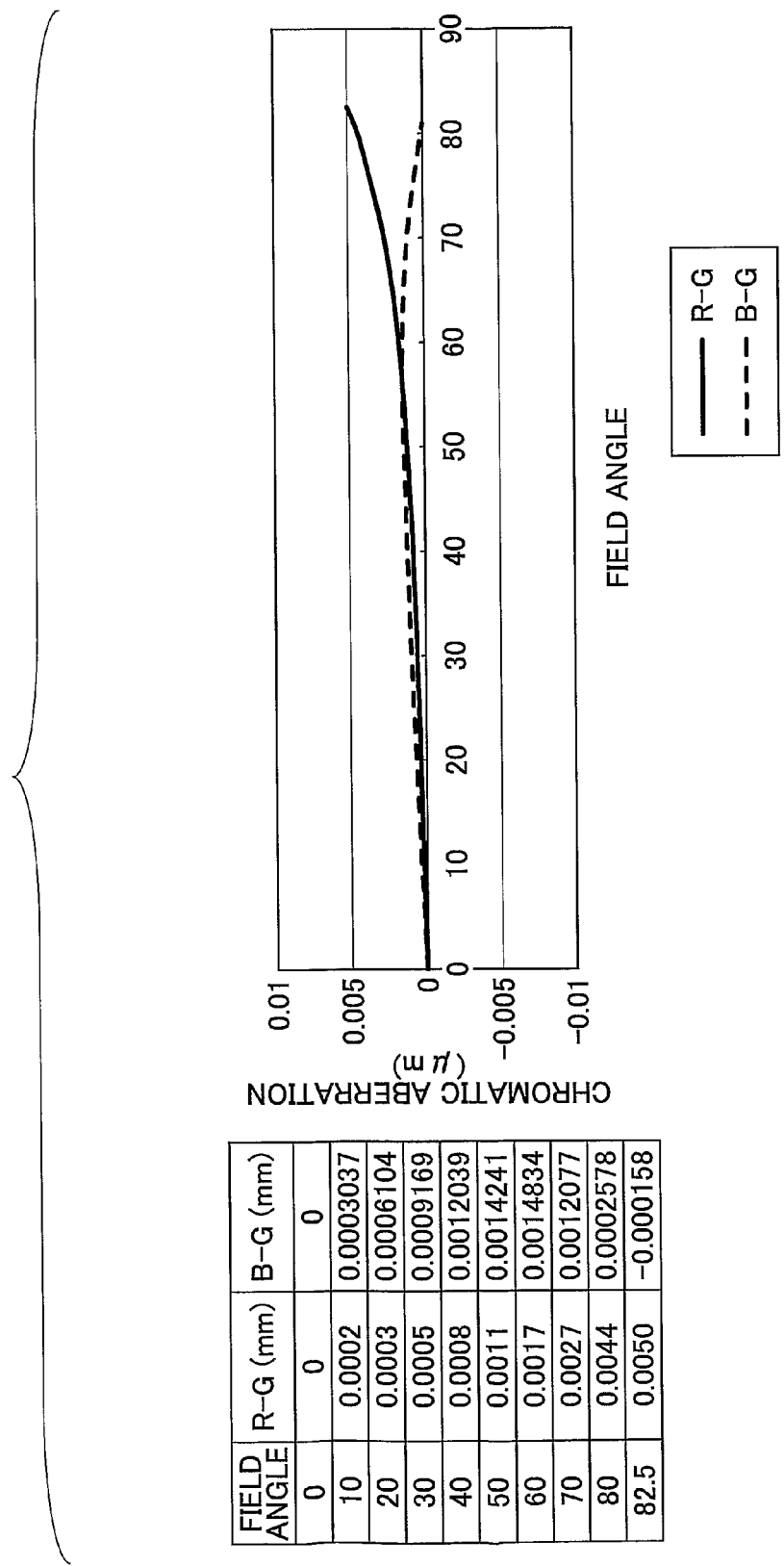
FIG. 13 illustrates relative differences in chromatic aberration of magnification relevant to practical example 1.
Figure 14:
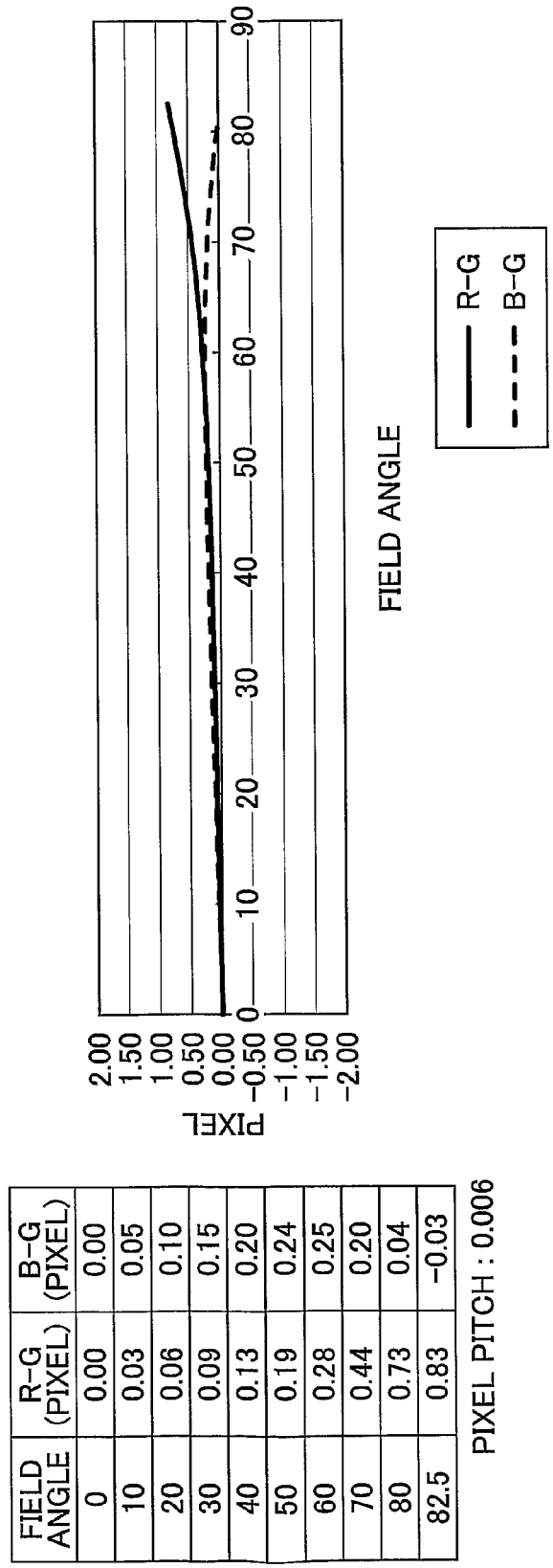
FIG. 14 illustrates relative differences in chromatic aberration of magnification (in units of pixels) relevant to practical example 1.
Figure 15:
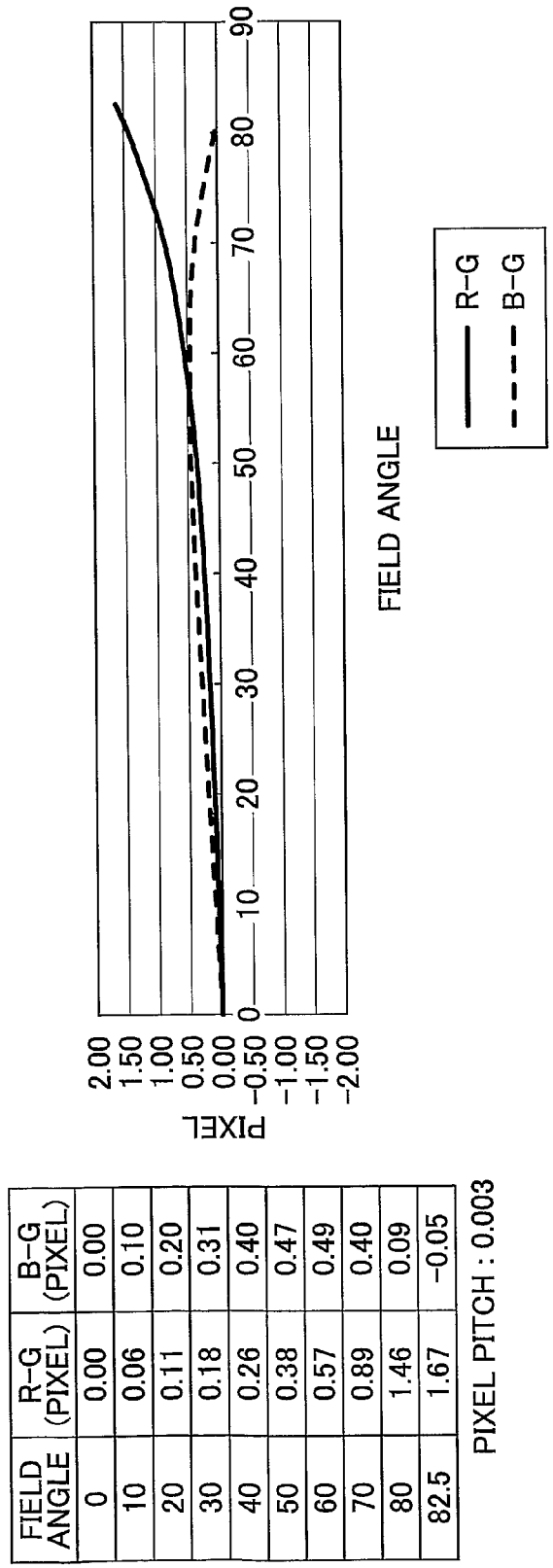
FIG. 15 illustrates relative differences in chromatic aberration of magnification (in units of pixels) relevant to practical example 1.
Figure 16:
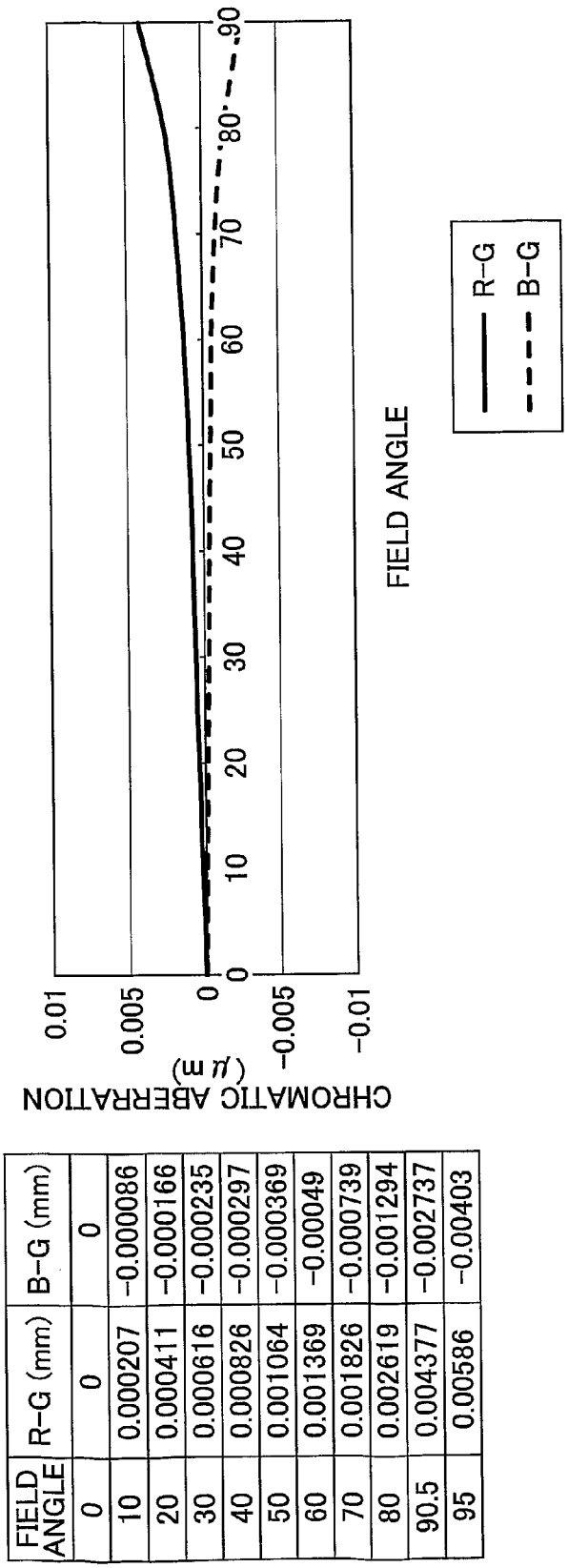
FIG. 16 illustrates relative differences in chromatic aberration of magnification relevant to practical example 2.
Figure 17:
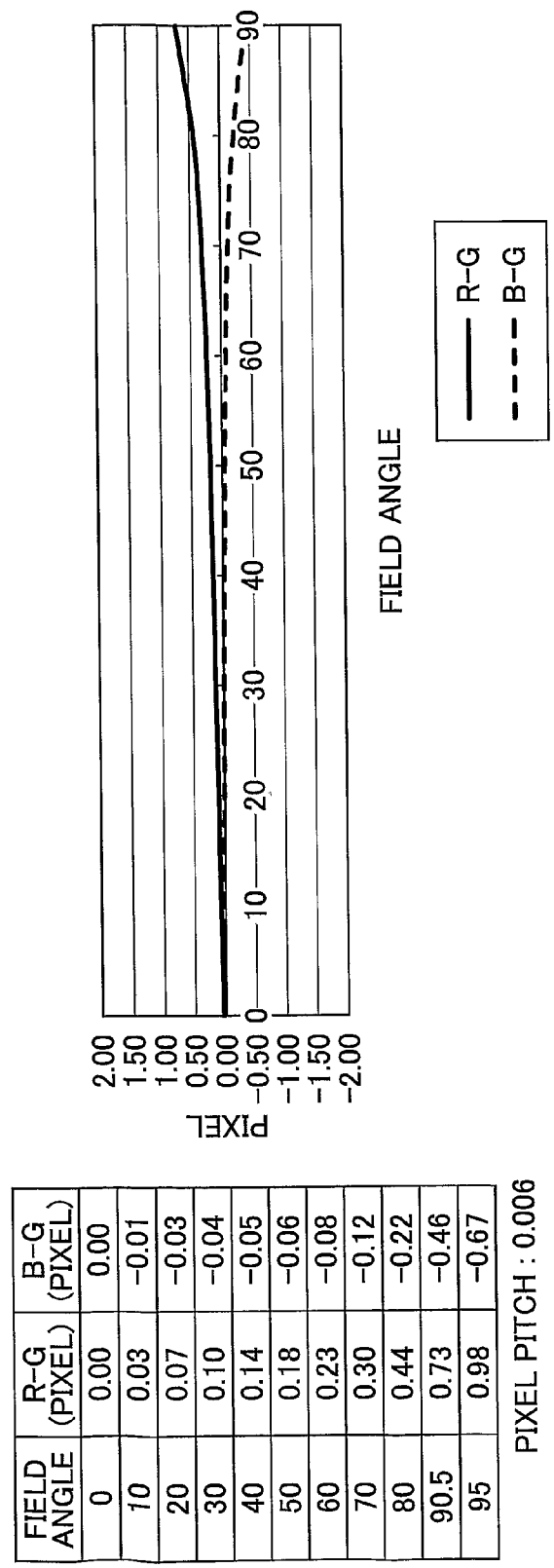
FIG. 17 illustrates relative differences in chromatic aberration of magnification (in units of pixels) relevant to practical example 2.
Figure 18:
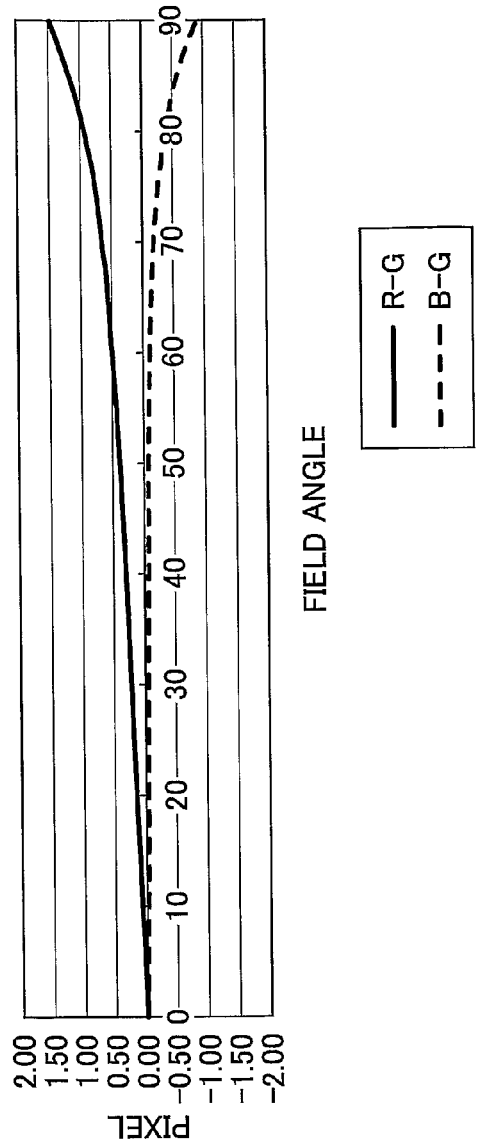
FIG. 18 illustrates relative differences in chromatic aberration of magnification (in units of pixels) relevant to practical example 2.

FIGS. 13 through 15 illustrate relative differences in chromatic aberration of magnification relevant to practical example 1 by using, as a reference, a green light (wavelength: 532 nm). Specifically, differences in chromatic aberration of magnification (R–G) between a red light (wavelength: 650 nm) and the green light, and differences in chromatic aberration of magnification (B–G) between a blue light (wavelength: 477 nm) and the green light, are shown. The table on the left side in FIGS. 13 through 15 indicates calculated values and the diagram on the right side of FIGS. 13 through 15 is a graph, where the horizontal axis represents the field angle and the vertical axis indicates the chromatic aberration of magnification.

In FIGS. 14 and 15, the vertical axis of the graph indicates the number of pixels.

Assuming that the difference in the chromatic aberration of magnification R–G at a certain field angle corresponds to one pixel, it means that the imaging positions of the red light R and the green light G are displaced with respect to each other by one pixel at this certain field angle.

In the example of FIG. 14, the pixel unit of the vertical axis has a pixel pitch of: 0.006 mm (6 μm). In the example of FIG. 15, the pixel unit of the vertical axis has a pixel pitch off: 0.003 mm.

FIGS. 13 through 18 illustrate relative differences in chromatic aberration of magnification relevant to practical example 2, in the same manner as in FIGS. 13 through 15.

The wide angle lens according to practical example 1 or 2 may be combined with an image element to form an imaging device.

As described above, the imaging element is an area sensor type element such as a CCD or a CMOS. Specifically, the imaging element includes pixels arranged two-dimensionally. The imaging element converts, into image data, the image of an object, which is formed on the surface including pixels (i.e., the above-described imaging surface) by the wide angle lens.

In one example of an imaging element combined with the wide angle lens according to practical example 1 or 2, the shape of the receiving surface may be rectangular (H indicates the lengthwise direction and V indicates the widthwise direction). The pixel pitch is 6 μm in both the H and V direction, and the number of pixels is 640 (H direction)×480 (V direction).

In this example, the effective imaging area is 2.88 mm (V direction)×3.84 mm (H direction)×4.80 mm (D direction: diagonal direction).

In addition to the wide angle length and the imaging element, an electronic processing unit may also be included in the imaging device.

Figure 19:
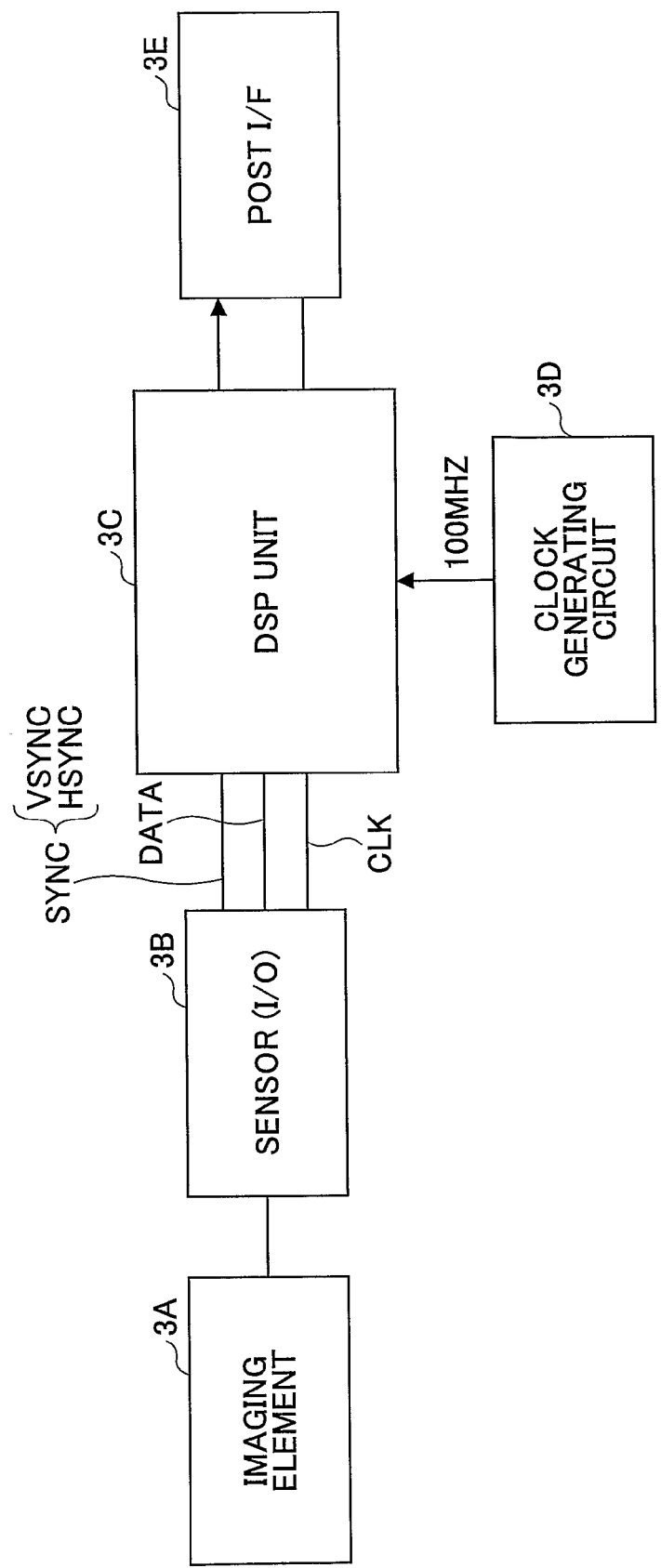
FIG. 19 illustrates the parts relevant to an imaging element and an electronic processing unit of an imaging device.

FIG. 19 illustrates the parts relevant to the imaging element and the electronic processing unit of the imaging device.

The electronic processing unit is at a subsequent stage of the imaging element denoted by 3A. The electronic processing unit includes a memory for storing image data output from the imaging element 3A, a memory output control circuit for outputting image data corresponding to a specified field angle, a first signal processing circuit for correcting the distortion aberration of the wide angle lens, and a second signal processing circuit for correcting the MTF of the wide angle lens.

Specifically, as shown in a typical block circuit of FIG. 19, the photoelectric conversion signals of the imaging element 3A are output from a sensor (I/O) 3B. The sensor (I/O) 3B outputs, for example, SYNC (V-SYNC, HSYNC) signals, DATA signals, and CLK (clock) signals.

For example, there are 10 bits of data signals for each of R, G, and B, and CLK signals are 25 MH.

These signals are input to a signal processing unit (DSP unit) 3C, where they are processed. The DSP unit 3C includes the above-mentioned memory, the memory output control circuit, the first signal processing circuit, and the second signal processing circuit.

The hardware configuration may include any element as long as the process described below can be performed on the programmable logic of FPGA and DSP and input signals such as ASIC. A clock generating circuit 3D inputs clock signals of, for example, 100 MH, into the DSP unit 3C.

Figure 20:
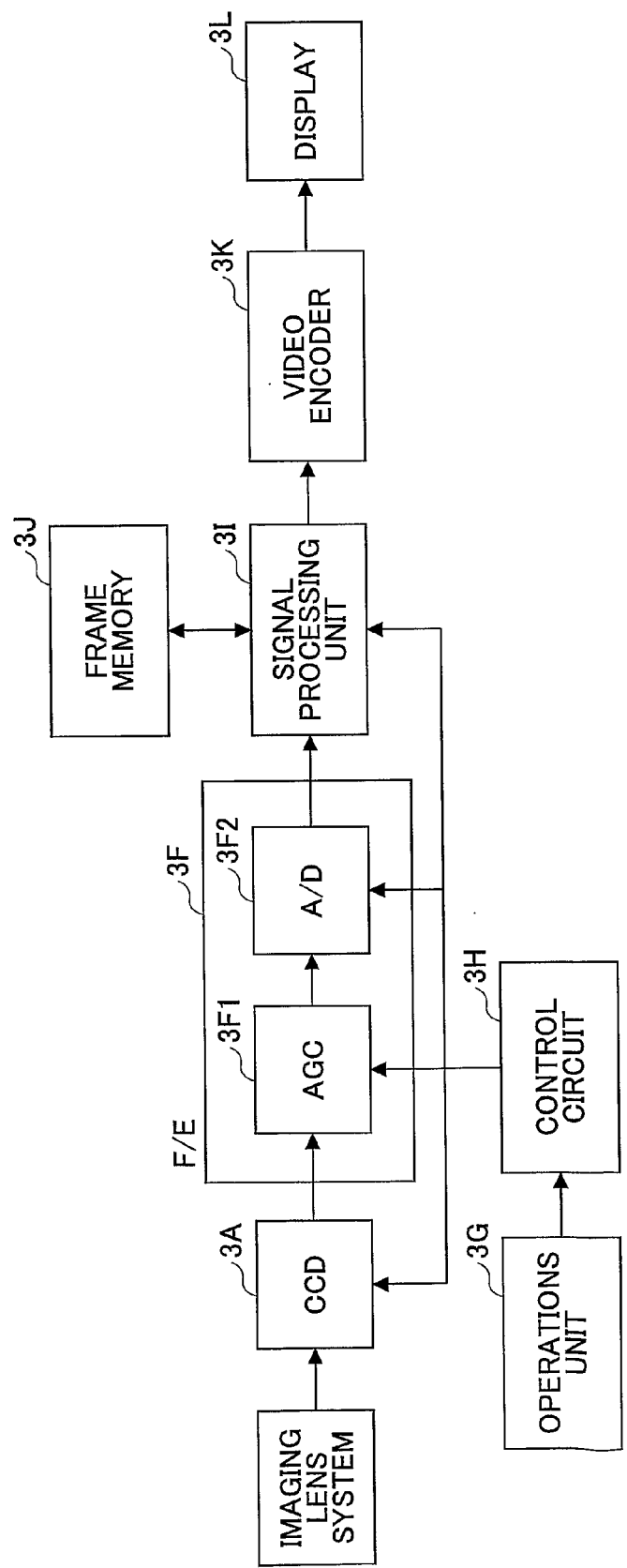
FIG. 20 illustrates a block circuit indicating a detailed configuration of the imaging device.

Output from the DSP unit 3C is converted by a post I/F 3E, so as to be output in a required format of the system. The output format may be, for example, YUV422, YUV444, and YUV221 in the case of digital signals. In this example, it is assumed that the signals are converted into NTSC signals FIG. 20 illustrates a block circuit indicating a detailed configuration of the imaging device.

With the use of the imaging lens system (above-described wide angle lens of practical example 1 or 2 shown in FIGS. 1 and 2, respectively), an image of an object (object image) is formed on an image surface (above-described imaging surface IS) of the CCD corresponding to the imaging element 3A. The imaging element 3A performs photoelectric conversion on the object image to convert it into electronic image data. The object image formed by the wide angle lens has a distortion aberration as indicated in FIG. 11 or 12.

A preprocessing unit 3F includes an automatic gain controller 3F1 and an A/D converter 3F2. The automatic gain controller 3F1 performs automatic gain control on the image data output from the imaging element 3A. The A/D converter 3F2 converts the image data into digital signals, so that digital image data is generated. The automatic gain controller 3F1 is adjusted by a control circuit 3H that is controlled according to operations input to an operations unit 3G.

A signal processing unit 3I performs image processing on the digital image data. The image processing includes a process for improving image deterioration caused by the imaging element 3A and a process for improving image deterioration caused by the wide angle lens.

For example, the pixels of the imaging element 3A are arranged in a Bayer arrangement, in which the number of green (G) pixels is larger than the number of red (R) pixels or the number of blue (B) pixels. When creating each of the color images of R, G, and B, if the image data sets of R, G, and B are merely extracted and combined together, the color images will be displaced with respect to each other due to the displaced pixel arrangements.

First, the signal processing unit 3I performs a process of rearranging the pixels and a process of correcting the white balance among R, G, and B. Accordingly, the process for correcting image deterioration caused by the imaging element 3A is performed. Subsequently, the signal processing unit 3I performs a process of correcting factors that cause image deterioration, which arise from the imaging lens system, such as distortion aberration and MTF deterioration.

When performing these correction processes, the image data sets of R, G, and B are temporarily stored in a frame memory (memory) 3J. The control circuit 3H also functions as the memory output control circuit for outputting image data corresponding to a specified field angle from the memory. The image data read out from the frame memory 3J is processed by the signal processing unit 3I according to need. The digital image data is then output from the signal processing unit 3I, input to a video encoder 3K, and then to a display 3L.

Figure 21:
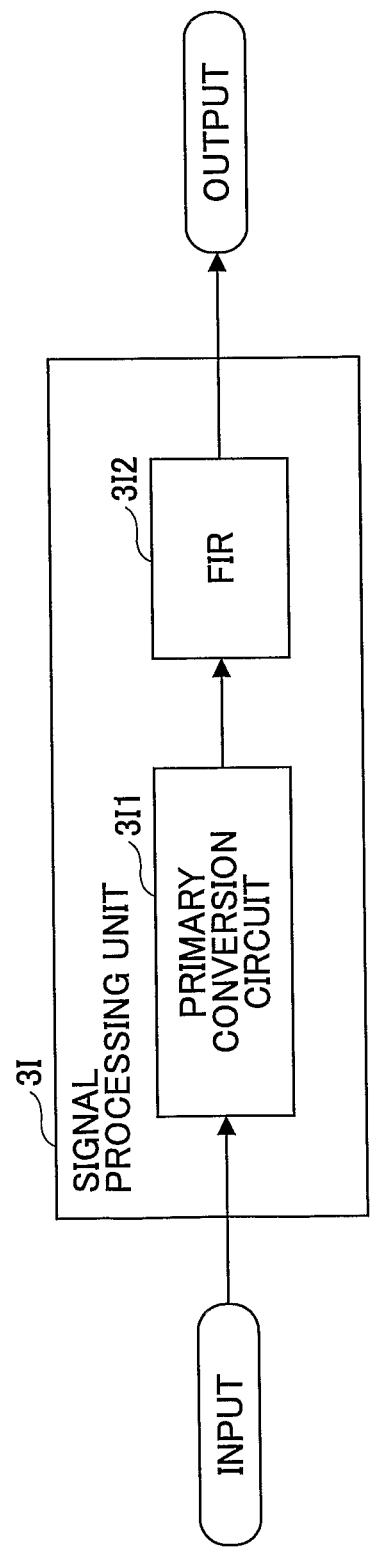
FIG. 21 illustrates a detailed configuration of a signal processing unit.

FIG. 21 illustrates a detailed configuration of the signal processing unit 3I. The detailed configuration shows only the first signal processing circuit and the second signal processing circuit.

The first signal processing circuit is constituted by a primary conversion circuit 3I1. The second signal processing circuit is constituted by an FIR filter circuit 3I2.

The primary conversion circuit 3I1 receives digital image data sets of R, G, and B that have undergone the process of correcting image deterioration caused by the hardware configuration of imaging element 3A. The primary conversion circuit 3I1 performs a primary conversion process on these digital image data sets of R, G, and B. The primary conversion process is a coordinate conversion process for converting coordinates of the input image data into coordinates of the output image data by performing mapping, in consideration of the distortion of the object image caused by distortion aberration. Accordingly, a process of correcting distortion aberration is executed.

The distortion aberration is specified as one of the properties of the wide angle lens at the stage of designing the device. Therefore, the distortion aberration may already be known, or may be obtained by actually measuring the lens. Based on the distortion aberration property, it is possible to determine a coordinate conversion formula used for converting the coordinates of the input image data into coordinates of the output image data. By making corrections according to this formula, the distortion aberration can be eliminated, i.e., distortions in the image data can be corrected. For example, the conversion formula may be approximated by using a polynomial equation.

In some cases, the light volume distribution may change due to compression/decompression of pixels according to the formula, and shading may appear. Thus, inconsistencies in the light volume are corrected by multiplying the brightness of each pixel by a coefficient corresponding to the enlargement factor of the area of each pixel.

The digital image data whose distortion aberration has been corrected as described above is then input into the FIR filter circuit 3I2 in the next stage. The FIR filter circuit 3I2 performs a process such as deconvolution on the digital image data that is output from the primary conversion circuit 3I1.

Accordingly, deterioration of the MTF is corrected. A Weiner filter or a simple HPF (high path filter) may be used as the FIR filter.

The distortion aberration of the wide angle lens of practical example 1 and 2 is successfully corrected as shown in FIGS. 11 and 12. However, the distortion aberration may be purposely generated according to need/request, in which case the distortion aberration does not need to be corrected. Correction of the distortion aberration may be performed optionally.

According to an embodiment of the present invention, a wide angle lens whose field angle exceeds 160 degrees includes a front group, an aperture stop, and a rear group, which are arranged in the stated order from an object side toward an image side.

The front group includes a first lens that is a negative meniscus lens whose convex surface is facing the object side, a second lens that is a negative lens, a third lens that is a negative lens, and a fourth lens that is a positive lens, which are arranged in the stated order from the object side toward the image side. Thus, the refractive power distribution is negative/negative/negative/positive.

By disposing three negative lenses on the object side in the front group, a light beam of a maximum field angle that enters the first lens at a large angle (with respect to the optical axis) can be efficiently corrected so as to become parallel to the optical axis. For this purpose, a negative meniscus lens whose convex surface is facing the object side is used as the first lens, where the incidence field angle is large.

The rear group includes a fifth lens that is a positive lens, a sixth lens that is a negative lens, and a seventh lens that is a positive lens, which are arranged in the stated order from an aperture stop side toward the image side. The fifth lens and the sixth lens are combined together, forming a cemented lens having positive refractive power.

The rear group includes the cemented lens having positive refractive power and the seventh lens that is a positive lens, and thus has a positive refractive power overall.

The fifth lens is made of a material having an Abbe number $vd5$ that is greater than or equal to 50. The sixth lens is made of a material having an Abbe number $vd6$ that is less than or equal to 30.

A surface of the seventh lens facing the image side is an aspheric surface.

The fourth lens is preferably made of a material having an Abbe number $vd4$ that is less than or equal to 30.

The thickness $d4$ of the fourth lens and a focal length F of the entire imaging system preferably satisfy the following condition (1).

$$5.0 < d4/F < 6.0. \qquad (1)$$

The aspheric surface of the seventh lens facing the image side may primarily have a function of adjusting distortion aberrations.

The field angle may exceed 180 degrees.

The wide angle lens may have an F-number of substantially 2.0 (for example, 1.9 through 2.4).

The first to sixth lenses are made of optical glass, and the seventh lens is made of resin.

An imaging device according to an embodiment of the present invention includes a wide angle lens and an imaging element.

The wide angle lens included in the imaging device may be any of the above described wide angle lenses according to an embodiment of the present invention.

The imaging element included in the imaging device includes pixels that are arranged two-dimensionally. The imaging element is configured to perform a conversion process to convert an image of an imaging target formed by the wide angle lens into image data. An area sensor such as a CCD or a CMOS may be used as the imaging element.

The imaging device may further include an electronic processing unit configured to execute an electronic process on the image data obtained by the conversion process performed by the imaging element.

The electronic process performed on the image data, which is obtained as a result of the conversion process of the imaging element, may be any known imaging process or transmission process, such as the process for correcting aberration and MTF as described in patent document 3.

As described above, according to an embodiment of the present invention, in the wide angle lens having a field angle exceeding 160 degrees, the chromatic aberration is properly corrected, thereby providing a wide angle lens of high resolution. Furthermore, the wide angle lens preferably has high brightness with a low F-number.

The F-number, which is an index of brightness, is the focal length divided by the incident aperture diameter. To reduce the F-number for the purpose of increasing the brightness, the focal length is to be reduced and the incident aperture diameter is to be increased. However, in either case, the angle between the on-axis light beam and the off-axis light beam increases, which may increase the chromatic aberration (particularly, chromatic aberration of magnification). Consequently, the quality of the image formed by the imaging device may deteriorate.

It is known that by using, in combination, a positive lens made of a material of a high Abbe number and a negative lens made of a material of a low Abbe number, the chromatic aberration can be reduced. Furthermore, it is known that by adhering together such a positive lens and a negative lens to form a cemented lens, the chromatic aberration can be reduced even further.

However, the conventional cemented lens (see, for example, patent documents 1 and 2) has the following problem. The cemented lens, which is disposed on the image side of the aperture stop, includes a negative lens made of a material of a low Abbe number facing the object side and a positive lens made of a material of a high Abbe number facing the image side. If the lenses are combined in this manner, the surface at which the lenses are cemented (cement surface) will have a convex shape protruding toward the aperture stop. Accordingly, the principal light beams at respective field angles will enter the lens at a large angle with respect to the normal line of the cement surface. Consequently, coma aberration may frequently occur.

In the wide angle lens according to an embodiment of the present invention, the cemented lens, which is disposed on the image side of the aperture stop, includes a positive lens made of a material of a high Abbe number (the fifth lens) facing the aperture stop side, and a negative lens made of a material of a low Abbe number (the sixth lens) facing the image side.

Accordingly, due to the difference in the Abbe numbers of the materials of the fifth lens (positive lens) and the sixth lens (negative lens), the chromatic aberration can be properly corrected. Furthermore, the concave surface of the cement surface is facing the aperture stop side. Therefore, the principal light beams that have passed through the center of the aperture enters the cement surface at a small angle with respect to the normal line of the cement surface (i.e., at a concentric state). Thus, coma aberrations can be effectively reduced.

In order to make the fifth and sixth lenses efficiently function as described above, the fifth lens is preferably made of a material having an Abbe number $vd_5$ that is greater than or equal to 50, and the sixth lens is preferably made of a material having an Abbe number $vd_6$ that is less than or equal to 30.

When the fifth lens is made of a material having an Abbe number $d_5$ that is less than 50, the chromatic aberration may not be sufficiently corrected even if the fifth lens is combined with the sixth lens that is made of a material having an Abbe number $vd_6$ that is less than or equal to 30. Meanwhile, when the fifth lens is made of a material having an Abbe number that is greater than or equal to 65, the chromatic aberration will be corrected more than necessary.

When the sixth lens is made of a material having an Abbe number $vd_6$ that exceeds 30, the chromatic aberration may not be sufficiently corrected even if the sixth lens is combined with the fifth lens that is made of a material having an Abbe number $vd_5$ that is greater than or equal to 50. Meanwhile, when the sixth lens is to have an Abbe number that is less than or equal to 15, it would be difficult to form the sixth lens with existing glass materials. Even if the sixth lens is made with an existing glass material, the chromatic aberration will be corrected more than necessary.

An embodiment of the present invention provides a wide angle lens in which the chromatic aberration is properly corrected, thus attaining high resolution. In the front group, three negative lenses (first to third lenses) are disposed from the object side, and a positive lens (fourth lens) is disposed on the image side of these three negative lenses.

The three negative lenses (first to third lenses) have a function of widening the field angle in order to attain a wide angle exceeding 160 degrees. The fourth lens, which is disposed on the image side of the three negative lenses, has a function of cancelling, at its surface on the aperture stop side, the chromatic aberration of magnification generated at the three negative lenses (first to third lenses), to correct the chromatic aberration.

In order to make the fourth lens efficiently function as described above, the fourth lens is preferably made of a material having an Abbe number $vd_4$ that is less than or equal to 30.

When the fourth lens is made of a material having an Abbe number that exceeds 30, the chromatic aberration generated in the group of negative lenses (first to third lenses) in the front group may not be sufficiently corrected. When the fourth lens is made of a material having an Abbe number that is less than or equal to 15, it would be difficult to form the fourth lens with existing glass materials. Even if the fourth lens is made with an existing glass material, the chromatic aberration will be corrected more than necessary.

By making the fourth lens have a large thickness, a light beam in the front group can be guided to the aperture stop in a moderate manner.

Particularly, the surface of the fourth lens on the object side preferably has a moderate curvature. Accordingly, aberrations, such as spherical surface aberration and coma aberration, can be reduced.

As to the thickness of the fourth lens, the ratio (parameter $d_4/F$) of the thickness $d_4$ of the fourth lens and the focal length F of the entire imaging system preferably satisfies the following condition (1).

$$5.0 < d_4/F < 6.0 \qquad (1)$$

When the parameter $d_4/F$ is less than or equal to the lower limit 5.0, it would be difficult to maintain a low spherical surface aberration and a low coma aberration, while maintaining a proper balance between the chromatic aberration of magnification of the first to third lenses and the chromatic aberration of magnification at surface of the fourth lens (used for correction) facing the aperture stop. Thus, the resolution may decrease.

If the parameter d4/F was greater than or equal to 6.0, the following problem would arise. Specifically, the fourth lens would be too thick, thus increasing the total length of the wide angle lens. Consequently, a compact wide angle lens may not be achieved.

As long as chromatic aberration can be corrected so that high resolution is achieved, the materials of the fourth and sixth lenses do not necessarily need to have an Abbe number of less than or equal to 30. However, in order to attain an F-number as low as substantially 2.0, the fourth and sixth lenses preferably have an Abbe number of less than or equal to 30.

It goes without saying that aberrations other than chromatic aberration also need to be corrected to improve image quality. The wide angle lens according to an embodiment of the present invention includes five separate lenses and one cemented lens formed by adhering two lenses together. Thus, there are 13 lens surfaces that can have different parameters. Therefore, the wide angle lens can have multiple design parameters. Accordingly, a higher degree of freedom may be provided in terms of designing a configuration for correcting aberration.

The surface of the seventh lens on the image side is the last lens through which the imaging light beam passes. Thus by using an aspheric surface for this surface, various aberrations that have been generated in the first through sixth lenses can be efficiently corrected.

In a typical imaging lens, various aberrations are preferably corrected so that the aberrations are reduced. Distortion aberration is also preferably corrected.

However, as imaging lenses in in-vehicle cameras and monitor cameras have wide angles, the displayed image covers a wide field angle. Therefore, a displayed screen page with reduced distortion aberration may not always be easy to observe. There may be cases where the displayed screen page is easier to observe when there is a certain amount of distortion aberration. This may depend on the size of the display screen.

At the surface of the seventh lens on the image side, the on-axis principal light beam and the off-axis principal light beam are separated. Therefore, by appropriately forming the shape of the aspheric surface according to the position of the imaging light beam, the distortion aberration can be adjusted. In the practical examples described above, both surfaces of the seventh lens are aspheric surfaces. The seventh lens is preferably made of resin because the seventh lens is formed to have aspheric surfaces.

An embodiment of the present invention provides a wide angle lens in which the chromatic aberration is properly corrected, thus attaining high resolution. The wide angle lenses according to the above practical examples have wide field angles of 165 degrees and 190 degrees, high resolution (because the chromatic aberration is properly corrected), and high brightness with an F-number of 2.0.

The present invention is not limited to the specific embodiments described herein, and variations and modifications may be made without departing from the scope of the present invention.

The present application is based on Japanese Priority Application No. 2009-106706 filed on Apr. 24, 2009 with the Japan Patent Office, the entire contents of which are hereby incorporated by reference.

The invention claimed is:

1. A wide angle lens whose field angle exceeds 160 degrees, comprising:
    a front group, an aperture stop, and a rear group, which are arranged in the stated order from an object side toward an image side, wherein
    the front group includes a first lens that is a negative meniscus lens whose convex surface is facing the object side, a second lens that is a negative lens, a third lens that is a negative lens, and a fourth lens that is a positive lens, which are arranged in the stated order from the object side toward the image side,
    the rear group includes a fifth lens that is a positive lens, a sixth lens that is a negative lens, and a seventh lens that is a positive lens, which are arranged in the stated order from an aperture stop side toward the image side, wherein the fifth lens and the sixth lens are combined together forming a cemented lens having positive refractive power,
    the first to seventh lenses form an imaging system including a total of seven lenses,
    the fifth lens is made of a material having an Abbe number vd5 that is greater than or equal to 50,
    the sixth lens is made of a material having an Abbe number vd6 that is less than or equal to 30, and
    a surface of the seventh lens facing the image side is an aspheric surface.

2. The wide angle lens according to claim 1, wherein the fourth lens is made of a material having an Abbe number vd4 that is less than or equal to 30.

3. The wide angle lens according to claim 1, wherein a thickness d4 of the fourth lens and a focal length F of the entire imaging system satisfy a condition of 5.0<d4/F<6.0.

4. The wide angle lens according to claim 1, wherein the aspheric surface of the seventh lens facing the image side primarily has a function of adjusting distortion aberrations.

5. The wide angle lens according to claim 1, wherein the field angle exceeds 180 degrees.

6. The wide angle lens according to claim 1, wherein the wide angle lens has an F-number of substantially 2.0.

7. The wide angle lens according to claim 1, wherein the first to sixth lenses are made of optical glass, and the seventh lens is made of resin.

8. An imaging device comprising:
    the wide angle lens according to claim 1; and
    a color imaging element including pixels that are arranged two-dimensionally, the color imaging element being configured to perform a conversion process to convert an image of an imaging target formed by the wide angle lens into image data.

9. The imaging device according to claim 8, further comprising:
    an electronic processing unit configured to execute an electronic process on the image data obtained by the conversion process performed by the color imaging element.

* * * * *